Sept. 21, 1926.  W. M. WHITNEY  1,600,261
WOOD SHAPING MACHINE
Filed Oct. 26, 1925    4 Sheets-Sheet 2

Sept. 21, 1926.  
W. M. WHITNEY  
WOOD SHAPING MACHINE  
Filed Oct. 26, 1925  
1,600,261  
4 Sheets-Sheet 3

Fig 3

INVENTOR  
William M. Whitney  
BY Robt. P. Harris.  
ATTORNEY

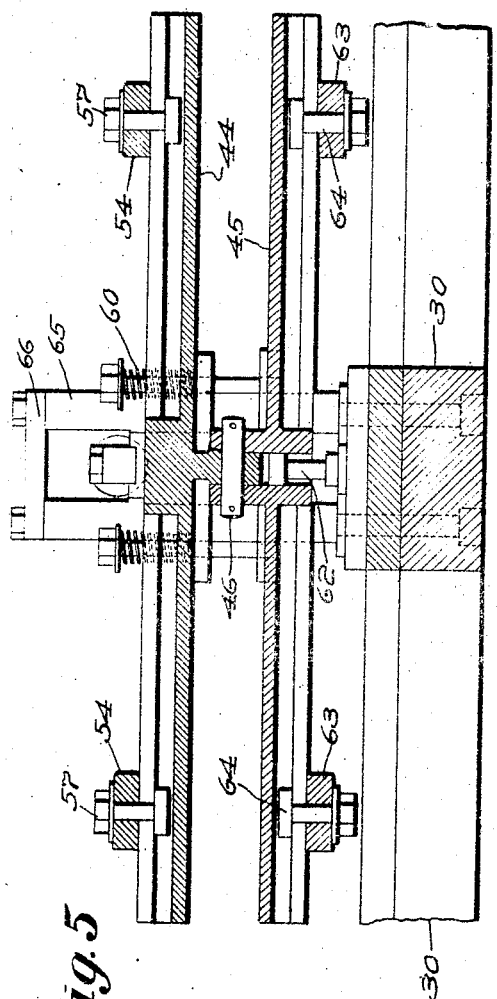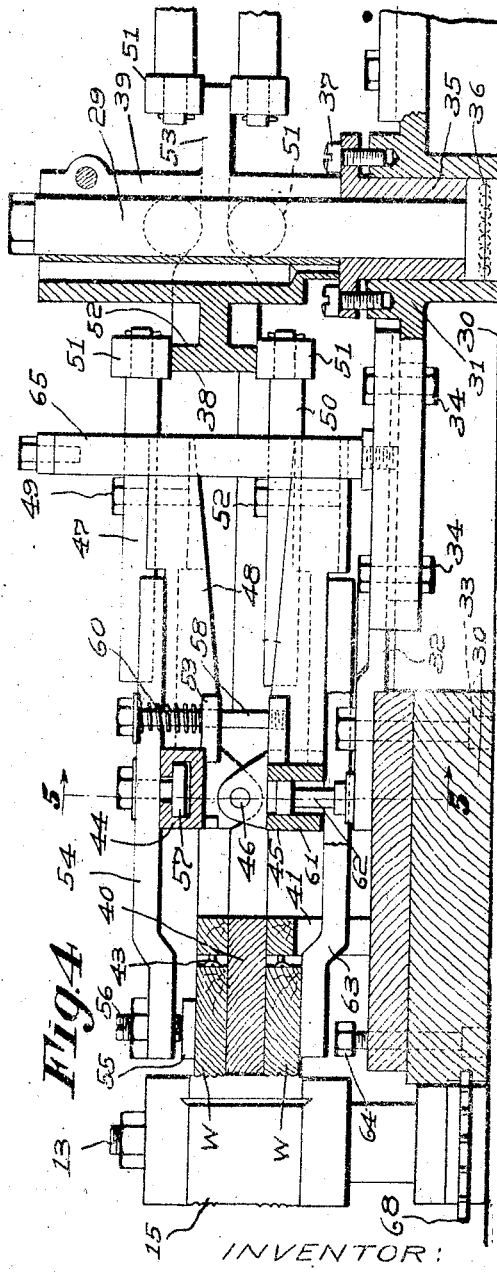

Patented Sept. 21, 1926.

1,600,261

UNITED STATES PATENT OFFICE.

WILLIAM M. WHITNEY, OF WINCHENDON, MASSACHUSETTS.

WOOD-SHAPING MACHINE.

Application filed October 26, 1925. Serial No. 64,796.

This invention relates to wood working machines and more particularly to work carriers for supporting the work in position to be acted upon by a cutter.

Wood working machines have been employed heretofore having a rotating carrier for supporting the work and feeding it relatively to the cutter, but in operating these machines as constructed heretofore, it has been necessary to move the work carrier away from the cutting position in order to remove a finished piece of work and substitute a new piece to be operated on by the cutter. This has necessitated a suspension of the cutting operation each time a piece of work is changed upon the work carrier, with the result that the output of the machines has been considerably lower than it would have been if the machines had been constructed to be operated continuously.

The present invention is therefore directed to work supporting means which is so constructed that the work upon one portion of the rotating carrier may be changed while the cutter is operating upon a piece of work secured to a different portion of the carrier, and as a result the cutter may operate upon one piece of work after the other without a suspension in the operation while work is being changed.

One important feature of the invention therefore resides in a work carrier having clamping means for securing several pieces of work to the carrier so that they will be acted upon one after the other by the cutter, and in the construction by which a finished piece of work may be removed and another piece inserted in its place during the operation of the cutter upon work secured to a different portion of the carrier.

Another feature of the invention resides in means operated by the rotation of the work carrier for automatically moving the work holding clamps to the work engaging position as a piece of work approaches the cutter and for releasing the work after it has been acted upon by the cutter.

Still another feature of the invention resides in the construction by which similar pieces of work may be secured to the opposite faces of the work support so that the same cutter may operate upon the two pieces simultaneously, and in the clamping means for holding the two pieces in place during the cutting operation and for releasing them when this operation is completed.

Other features of the invention and novel combination of parts in addition to the above will be hereinafter described in connection with the accompanying drawings which illustrate one good practical form of the invention.

In the drawings:—

Fig. 3 is a vertical sectional view thru that portion of the machine which supports the carrier.

Fig. 4 is an enlarged sectional view taken on the line 4—4 of Fig. 2; and

Fig. 5 is a sectional view taken on the line 5—5 of Fig. 4.

The work carrier of the present invention may be employed upon various different types of machines for shaping wooden blanks in conformity with a predetermined form or pattern, and it may be used in connection with a cutter the rotating axis of which is held in a fixed position, or in connection with a cutter that is mounted for movement bodily towards and from the work carrier.

Figure 1:
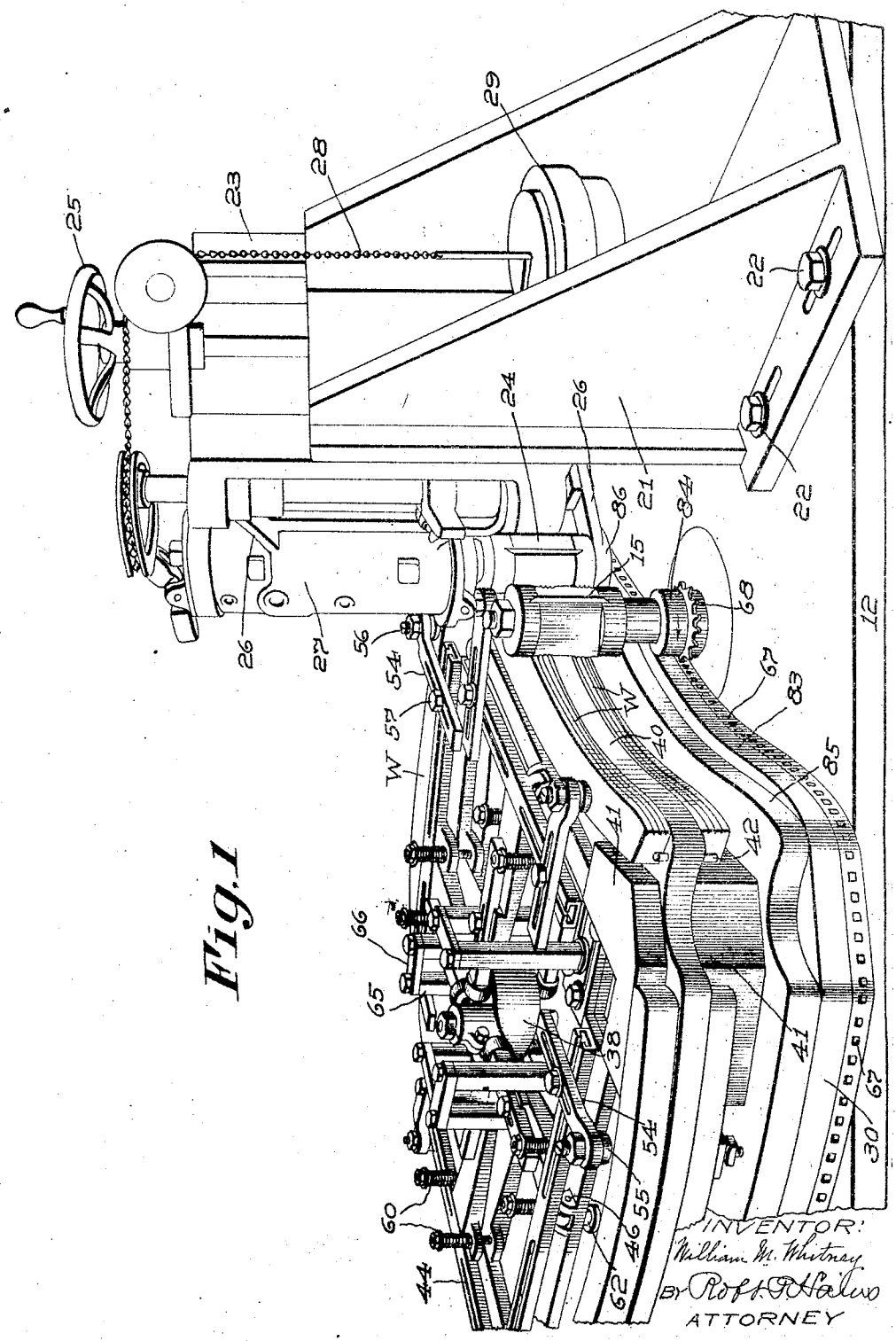
Fig. 1 is a perspective view of the upper portion of a wood shaping machine provided with a work carrier constructed in accordance with the present invention.

In the construction disclosed in Fig. 1 two cutters are shown, one of which rotates about a fixed axis and the other of which is mounted for swinging movement toward and from the work.

The wood shaping machine may be provided with a supporting frame of any suitable construction and is shown in Fig. 3 as having a column 10 provided with a flaring base 11, and at the upper end of the column 10 is provided the table 12.

In the construction shown the table 12 is provided with a vertical shaft 13 mounted in a fixed bearing 14 and the upper portion of this shaft is provided with the cutter 15 the cutting blades of which may have any desired configuration, depending upon the shape to be given to the work upon which it operates. The cutter shaft 13 may be driven by a belt, or by an electric motor, and is shown as having the electric motor 16, and since it may be desirable to raise and lower the cutter relative to the upper face of the table 12, the shaft 13 and motor 16 are supported for adjustment in a vertical direction.

This vertical adjustment may be effected by the adjusting screw 17, the threaded portion of which engages a lug 18 secured to the motor casing, and the screw 17 is rotatably supported by the machine frame and may be rotated by a hand wheel 19 which is operatively connected to the screw by bevel gears 20.

Since more or less difficulty is experienced in operating a cutter against the grain of the wood, in the construction shown in Fig. 1, two cutters are provided, one of which rotates in a right hand direction, and the other in a left hand direction so that one cutter may operate upon the grain of the wood that extends in one direction, and the other cutter will operate upon the grain of the wood that extends in the opposite direction. The means shown in Fig. 1 for supporting the second cutter consists of a standard 21 which may be adjustably secured to the upper face of the table 12 by the bolts 22. A head 23 slidably secured to the standard 21 serves to support the swinging cutter 24 and this cutter may be raised and lowered upon rotating the hand wheel 25. The cutter 24 is shown as supported by arms 26 for swinging movement toward and from the work and it is driven by an electric motor within the casing 27. A chain 28 having a weight 29 secured to its lower end is provided to exert a continuous force upon the supporting means for the cutter 24 and tends to move the cutter towards the work. The construction and operation of the cutters just described form no essential part of the present invention and a more detailed description of their construction and operation is therefore deemed unnecessary.

The work carrier is supported in the construction shown for movement towards and from the fixed cutter 15, and to this end the work carrier to be described is mounted upon the slide 28 which is mounted within a slot formed in the table 12 and is movable towards and from the cutter. The slide 28 is provided with a fixed shaft 29 about which the work supporting carrier rotates and this carrier has a carrier base 30 which is secured to a spider frame 31 having a hub that is journaled upon the fixed shaft 29. In the construction shown the work carrying base is secured to the spider frame 31 and by the arms 32 secured to the base by bolts 33 and the arms 32 are adjustably secured to arms of the spider frame by bolts 34. The spider frame 31 is provided with a bearing sleeve 35 which is journaled upon the shaft 29, and the lower end of this sleeve rests upon an anti-friction bearing 36, the arrangement being such that the sleeve may be adjusted vertically relatively to the spider frame by adjusting the screws 37.

As stated, one feature of the invention resides in the construction by which the clamping means are automatically moved to the work holding position as the rotation of the work carrier advances the work towards the cutter, and the means shown for automatically operating the clamping means consists of an annular cam 38 the hub 39 of which is rigidly secured to the fixed shaft 29 so that the cam 38 is prevented from rotating with the work carrier.

Figure 2:
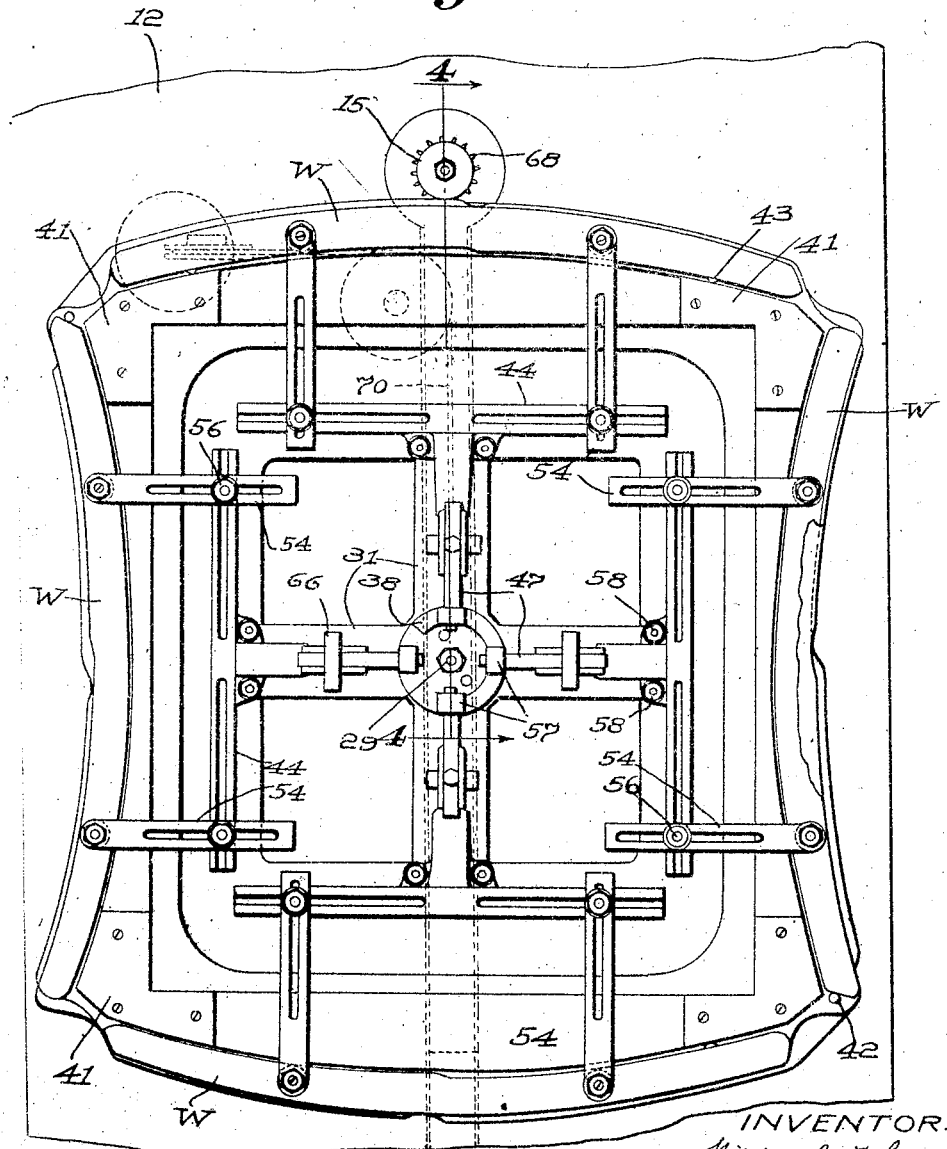
Fig. 2 is a top plan view of the work carrier of Fig. 1.

As above indicated another feature of the invention resides in the construction by which the work blanks may be secured to the upper and lower faces of a work support, and to this end, in the construction shown, the work support 40, which may have somewhat the form of a hollow ring or hollow square, as will be apparent from Figs. 1 and 2, is supported in spaced relation to the work carrier base 30 by the corner posts 41. In order that the work W may be properly positioned upon the work support 40 the work support may be provided with the pins 42 which form an abutment for one end of each of the work blanks, and movement of the work inwardly towards the axis of the rotating carrier may be limited by the adjustable screws 43 that may be mounted in the corner posts 41.

The means shown for simultaneously clamping one piece of work W to the upper face of the support 40, and a second piece to the lower face of this support, consists of the clamping carriers 44 and 45, which are mounted one above the other, and are pivotally connected by the pivot pin 46, as best shown in Fig. 4. As previously pointed out, the work carrier is constructed so that different pieces of work may be secured to the carrier in different positions about its periphery and the carrier is therefore provided with a number of clamping means for securing the work to the upper and lower faces of the work support, eight clamping carriers being shown in the present case, four being employed to secure the work to the upper face of the work support, and the other four for securing the work to the lower face.

Each of the upper clamp carriers 44 is provided with an inwardly extending arm 47 which is preferably adjustably secured to an inwardly extending portion 48 of the clamp carrier 44, the adjustment being obtained by means of the bolt 49.

Each lower clamp carrier 45 is likewise provided with an inwardly extending arm 50 adjustably secured to a portion of the clamp carrier by the bolt 52. The arms 47 and 50 are provided at their inner ends with the rollers 51 adapted to engage the cam operating means 38.

The cam 38 has a wide portion 52 which extends thru a substantial arc and a narrow portion 53 that forms the remaining portion of the circular cam. The arrangement is such that as the work carrier rotates some of the rollers 51 will engage the narrow portion 53 of the cam to permit the clamping means controlled by these rollers to release the work, while other rollers 51 will be forced apart by the wide portion 52 of the cam, and this will rock the clamp carriers about the pivot pin 46 and will move the clamps to the work holding position. The fixed cam 38 is secured to the shaft 29 so that the reduced portion of the cam 53 lies away from the cutters, and as a result each pair of pivoted clamping means will be moved into work holding position as they move under the rotation of the carrier towards the cutters and will be released as they move away from the cutters.

Each upper clamp carrier 44 is shown as provided with a pair of outwardly extending arms 54 and each of these arms is provided with clamping means 55 adjustably secured to its outer end by the threaded bolt 56. In order that work differing in size and shape may be supported upon the work carrier, it is desirable that the arms 54 be adjustably secured to the clamping carriers 44, and the clamping carriers are therefore provided with slots extending longitudinally of and adapted to receive the head of the bolts 57 which bolts extend thru slots extending longitudinally of the arms 54. As a result of this construction the arms 54 may be readily secured to the clamping carriers in various positions of adjustment.

As above stated the fixed cam 38 serves to force the clamping means into engagement with the work and to hold the work in place until a cutter has completed its operation upon the work and then serves to release the work. It is desirable to provide mechanism for moving the clamping means away from the work when the latter is to be released, and to this end in the construction shown each pair of clamping carriers 44 and 45 is provided with the bolts 58 the lower ends of which are secured to the clamping carrier 45, and the upper portion of each bolt extends thru a lug 59 upon the upper clamping carrier and a spring 60 is confined between the lug 59 and a nut at the upper end of the bolt. This construction serves to exert a yielding pressure upon the rocking levers that tends to move the clamps out of the work holding position. In the particular construction shown, each of the lower clamping carriers 45 is provided with a sleeve 61 which is mounted upon an upstanding pin 62 supported by the spider frame 31, and as a result of this construction the pivoted clamp carriers are held in place by the pins 62 for floating movement relative to the carrier frame. Each lower clamping carrier 45 is provided with a pair of outwardly extending arms 63 which are adjustably secured to their carriers by bolts 64 in the manner just described in connection with the upper clamp carriers, and the rocking movement of the arm 63 in a downward direction under the action of the springs 60 may be limited by an adjustable bolt 64 extending upwardly from the work carrier's base 30. It may be desirable to provide means for relieving the inwardly extending arms 47 and 50 of the upper and lower clamp carriers from the lateral displacing force to which they are subjected as the rollers 51 at the inner ends of these arms travel either up or down the inclined portion of the cam 38. To this end the spaced, upstanding posts 65 are provided, the lower ends of which are secured to the spider frame 31, and the upper ends of which may be connected by the bridge bar 66. The posts 65 serve also to prevent the pivoted clamp carriers from rocking about the positioning pins 62.

Various means might be provided for imparting a rotative movement to the work carrier to cause the same to feed the work relative to the cutter or cutters, and in the construction shown the work carrier base 30 is provided with a rack 67 in the form of a perforated strip of metal that extends entirely around the base 30 and this rack is adapted to engage and be driven by a gear 68 which rotates about the axis of the fixed cutter 13 and is driven at the desired speed by a series of gears 69, shown in Fig. 3. In the construction shown, means is provided for urging the work towards the fixed cutter, and to this end the slide 28 which rotatably supports the work carrier is provided with a cable 70 which is secured to the slide at 71 and this cable passes around several guide pulleys and has a weight 72 secured to its lower end.

Should it be desired to move the work carrier away from the cutter this may be done by pressing upon the foot treadle 73 pivotally secured to the lower portion of the rocking lever 74, the upper end of which is secured by the pivot pin 75 to a bracket 76 extending downwardly from the supporting table. Movement of the foot operating lever 74 is imparted by the link 77 to the rocking lever 78 pivotally supported at 79, and the upper end of this lever is provided with a dog 80 adapted to engage the toothed rack 81 secured to the under face of the slide 28. A dog 82 pivotally mounted upon the lever 78 and the rocking movement of which is controlled by the foot treadle 73 thru the chain 82ª serves to secure the rocking lever 78 in the carrier withdrawing position.

Various means might be provided for controlling the engagement of the cutters with the work presented to the cutters by the work carrier, and in the construction shown the work carrier is provided with a lower pattern or profile guide 83 adapted to engage a roller 84 mounted upon the cutter shaft 13, and which rotates with the driving gear 68. The engagement of the swinging cutter 24 with the work is controlled by a second pattern or profile guide 85 against which a portion 86 of the lower swinging arm 26 of the movable cutter rests. The profile guides 83 and 85 are preferably so constructed that the fixed cutter 15 will operate upon the work W where the grain extends in one direction, and as this cutter approaches the portion of the work in which the grain extends in the opposite direction the profile guide 83 will serve to force the work out of engagement with this cutter while a depressed portion of the upper profile guide 85 will permit the movable cutter 24 that rotates in the opposite direction to perform the cutting operation upon the remaining portion of the work. The particular means however for controlling the engagement of the work with the cutter forms no part of the present invention.

From the foregoing description and drawings it will be clear that the rotative movement of the work carrier relative to the fixed cam 38 serves to automatically move the work holding clamps to and from the operating position, the arrangement being such that as a pair of clamps are rotated towards the cutting position they will be forced into firm holding engagement with the work disposed at the upper and lower side of the work support 40 and after these two pieces of work have been fed past the cutters they will then be automatically released and the clamps will be moved to their inoperative position so that a workman may easily remove the finished pieces of work and substitute new blanks to be operated upon by the cutters. As a result of this construction the machine may operate continuously, as it is unnecessary to suspend its cutting operation in order to change the work.

What is claimed is:—

1. In a wood working machine, the combination of a rotating cutter, a work carrier supported for rotative movement relative to the cutter, a work support secured to the carrier in spaced relation thereto to provide a work receiving space between the carrier and work support, work securing clamps for securing the work to the opposite faces of the work support so that the cutter may operate simultaneously upon both pieces of work, and means operated by the movement of the carrier for moving the clamp simultaneously to the work holding position.

2. In a wood working machine, the combination of a rotating cutter, a work carrier supported for rotative movement relative to the cutter, a work support upon the carrier, work securing clamps for securing the work to the opposite faces of the work support so that the cutter may operate simultaneously upon both pieces of work, and means actuated by the rotative movement of the carrier for moving the clamps simultaneously to the work holding position.

3. In a wood working machine, the combination of a rotating cutter, a work carrier supported for rotative movement relative to the cutter, a work support upon the carrier, work securing clamps for securing the work to the opposite faces of the work support so that the cutter may operate simultaneously upon both pieces of work, a cam supported against rotation with the carrier, and means actuated by the rotation of the carrier relative to the cam for moving the clamps to the work holding position.

4. In a wood working machine, the combination of a rotating cutter, a work carrier supported to rotate in a horizontal plane to advance the work against the cutter, a work support upon the carrier and adapted to have pieces of work secured to its upper and lower faces, clamps for securing the work to both faces of the work support, and means operated by the rotation of the work carrier for moving the clamps to the work holding position and for releasing the work.

5. In a wood working machine, the combination of a rotating cutter, a work carrier supported to rotate relatively to the cutter about a central axis, a work support upon the carrier and adapted to have work secured to its opposite faces, clamps for securing the work to both faces of the work support, a double faced cam supported concentric with said axis and held against rotation with the carrier, and means engaging the opposite faces of the cam and operable by the rotative movement of the carrier to move the clamp to the work engaging position.

6. In a wood working machine, the combination of a rotating cutter, a work carrier supported to rotate relatively to the cutter, a work support upon the carrier and adapted to have work secured to its opposite faces, clamps for securing the work to both faces of the work support, a pair of pivoted levers supported by the carrier and provided with the clamps, and means operated by the rotative movement of the carrier for rocking the levers to move the clamps into position to secure the work to the opposite faces of the work support.

7. In a wood working machine, the combination of a rotating cutter, a work carrier supported to rotate relatively to the cutter, a work support upon the carrier and adapted to have work secured to its opposite faces, work holding arms pivotally supported by the carrier and provided with work engaging clamps that are adjustable relative to the arm, and means operated by the power imparted to the machine for actuating the arms to clamp the work to the opposite faces of the work support.

8. In a wood working machine, the combination of a rotating cutter, a work carrier supported to rotate relatively to the cutter, a work support upon the carrier adapted to have work secured to its opposite faces, clamps for securing several pieces of work to each face of the work support, and means actuated by the rotation of the carrier to clamp the work to each face of the work support as the work approaches the cutter and operable to release the work after it has been moved by the carrier past the cutter.

9. In a wood working machine, the combination of a rotating cutter, a work carrier supported to rotate relatively to the cutter, clamping means for securing the work to the carrier, comprising a clamp carrier pivotally supported for rocking movement toward and from the work receiving face of the carrier and a pair of arms secured to the clamp carrier for adjustment longitudinally and transversely thereof to bring their outer ends into clamping relation with the different size work and adapted to be rigidly secured to the clamp carrier in their adjusted position, and means for rocking the clamping means to the work holding position.

10. In a wood shaping machine, the combination of a rotating cutter supported to act upon the work, a slide movable toward and from the cutter, a work carrier rotatably mounted upon the slide, means for controlling the engagement of the work with the cutter, and means operable by the rotative movement of the carrier for automatically clamping the work to the carrier, including a clamping arm, and a cam rigidly secured to the slide to operate said arm.

11. In a wood working machine, the combination of a rotating cutter supported to act upon the work, a work carrier mounted for rotative movement past the cutter and for movement bodily toward and from the work, a pattern upon the carrier for controlling the engagement of the work with the cutter, and means operable by the rotative movement of the carrier for automatically clamping the work to the carrier, including a clamping arm, and a non-rotating cam for operating the arm and supported to move with the carrier toward and from the cutter.

12. In a wood shaping machine, the combination of a rotating cutter, a work carrier supported for rotative movement relative to the cutter and for movement bodily toward and from the cutter, a pattern for controlling the engagement of the cutter with the work, a central shaft about which the carrier rotates, a cam supported by said shaft and held thereby from rotating with the carrier, a clamp for securing the work to the carrier, and means actuated by the rotation of the carrier relative to said cam to move the clamp to the work holding position and for releasing the work.

13. In a wood working machine, the combination of a rotating cutter, a work carrier supported for rotative movement relative to the cutter and for movement bodily toward and from the cutter, means for controlling the engagement of the cutter with the work, a cam supported for movement bodily with the carrier but held from rotating therewith, a clamp for securing the work to the carrier, and means actuated by the rotation of the carrier relative to said cam to move the clamp to the work holding position and for releasing the work.

14. In a wood working machine the combination of a rotating cutter, a work carrier supported for rotative movement relative to the cutter and for movement bodily toward and from the cutter, clamps positioned about the axis of the carrier and operable independently to secure work to different portions of the carrier, means for controlling the engagement of the cutter with the work, a cam supported for movement bodily with the carrier but held from rotating therewith, and means actuated by the rotation of the carrier relative to said cam for successfully moving the clamp to the work holding position.

15. A wood working machine, comprising in combination, a rotating cutter, a work carrier movable relative to the cutter, a work support upon the carrier, means for securing the work to the opposite faces of the work support comprising a pair of clamp carriers pivotally connected and mounted upon the carrier for floating movement, and means actuated by the movement of the carrier for automatically moving the clamping means to the work holding position.

16. A wood working machine, comprising in combination, a rotating cutter, a work carrier movable relatively to the cutter, a work support upon the carrier constructed to have work secured to its opposite faces, means for simultaneously securing work to both faces of said support comprising a pair of clamp carriers pivotally connected and supported by the carrier for floating movement, and means actuated by the power imparted to the machine for rocking the clamp carriers about their pivotal connection to grip the work.

17. In a wood working machine, the combination of a power driven cutter, a work carrier supported for rotative movement relative to the cutter, a work support fastened to the carrier in spaced relation thereto to provide a work receiving space between the carrier and work support, work securing clamps disposed at the opposite sides of the work support and adapted to secure the work to the opposite faces of the work support, and power actuated means for forcing the clamp to the work holding position.

18. In a wood working machine, the combination of a power driven cutter, a work carrier supported for rotative movement relative to the cutter, a work support fastened to the carrier, work securing clamps disposed at the opposite sides of the work support and adapted to secure the work to the opposite faces of the work support, a fixed cam supported at the axis of the carrier so that it will not rotate with the carrier, arms projecting from the clamps into engagement with the cam to be actuated thereby, and posts adjacent the arms for forcing them against the actuating cam.

19. In a wood working machine, the combination of a power driven cutter, a work carrier supported for rotative movement relative to the cutter, a work support mounted upon the carrier and adapted to have work secured to its opposite faces, clamps for holding work against the opposite faces of the work support, operating arms for the clamps, and a cam supported between said arms and operable to wedge them apart as the carrier rotates to thereby force the clamps against the work.

In testimony whereof, I have signed my name to this specification.

WILLIAM M. WHITNEY.